(12) United States Patent
Hambitzer et al.

(10) Patent No.: US 6,709,789 B1
(45) Date of Patent: Mar. 23, 2004

(54) NON-AQUEOUS ELECTROCHEMICAL CELL

(76) Inventors: Günther Hambitzer, Durlacher Weg 9a, D-76327 Pfinztal (DE); Bernd Kreidler, Händelstrasse 3, D-76327 Pfinztal (DE); Ulrike Dörflinger, Schleichlingstrasse 6, D-76327 Pfinztal (DE); Volker Döge, Biesestrasse 2, D-76229 Karlsruhe (DE); Klaus Schorb, Karlsruher Strasse 114, D-76287 Rheinstetten (DE)

( * ) Notice: Subject to any disclaimer, the term of this patent is extended or adjusted under 35 U.S.C. 154(b) by 0 days.

(21) Appl. No.: 09/869,314
(22) PCT Filed: Jan. 19, 2000
(86) PCT No.: PCT/DE00/00177
§ 371 (c)(1),
(2), (4) Date: Aug. 6, 2001
(87) PCT Pub. No.: WO00/44061
PCT Pub. Date: Jul. 27, 2000

(30) Foreign Application Priority Data

Jan. 23, 1999 (DE) .......................................... 199 02 600

(51) Int. Cl.⁷ .......................... H01M 6/04; H01M 4/62; H01M 6/18
(52) U.S. Cl. ....................... 429/346; 429/232; 429/321; 429/322; 429/323
(58) Field of Search ............................. 429/346, 321, 429/322, 323, 232

(56) References Cited

U.S. PATENT DOCUMENTS

| 4,382,117 A | 5/1983 | Kunze ........................ 429/132 |
| 4,407,910 A | 10/1983 | Catanzarite ................... 429/57 |
| 4,844,993 A | 7/1989 | Chang et al. .................. 429/50 |
| 5,154,990 A | 10/1992 | Plichta et al. ................ 429/191 |
| 5,741,608 A | 4/1998 | Kojima et al. ................. 429/94 |

FOREIGN PATENT DOCUMENTS

| GB | 1258498 | * 6/1969 | .......... H01M/15/00 |
| WO | 9859387 | 12/1998 | |

OTHER PUBLICATIONS

Patent Abstracts of Japan, vol. 012, No. 320, Aug. 30, 1988 & JP 63 086355.
Patent Abstracts of Japan, vol. 012, No. 320, Aug. 30, 1988 & JP 63 086358.

* cited by examiner

Primary Examiner—Patrick Ryan
Assistant Examiner—Julian Mercado
(74) Attorney, Agent, or Firm—Rothwell, Figg, Ernst & Manbec, P.C.

(57) ABSTRACT

Nonaqueous electrochemical cell (9) with a negative electrode (4), an electrolytic solution and a positive electrode (3). The operational safety is increased by the fact that the cell contains a salt (10) in solid state in the area of at least one of the two electrodes (3,4).

15 Claims, 3 Drawing Sheets

NON-AQUEOUS ELECTROCHEMICAL CELL

The invention relates to a nonaqueous electrochemical cell. Such cells have a substantial practical-significance, in particular as electrical batteries. Non-rechargeable batteries (primary cells), as well as rechargeable batteries (secondary cells), have, in many cases, electrochemical cells with nonaqueous electrolytes.

For such cells, the required safety is an important issue. For many cell types, a strong heating, in particular, may lead to safety-critical conditions. It may happen that the cell housing breaks, or leakage occurs, causing noxious gaseous or solid matters, or even fire, to come out of the cell. A quick temperature rise can be caused not only by inadequate treatment, but also by internal or external short circuits during the cell operation.

In particular, such cells in which a strong increase of the temperature inside the cell supports exothermic reactions, are critical because this leads to a further increase of the temperature. This self-amplifying effect is by those skilled in the art also named as "thermal runway". Such problems are mainly discussed in the context of alkaline metal cells, i.e. cells in which an alkaline metal is deposited or incorporated, respectively, at the electrodes as active mass.

For experimental examination, so-called "nail tests" are performed. An internal short-circuit is simulated by piercing the positive and the negative electrode with a nail. For example with lithium ion cells, those tests resulted in a strong temperature increase and a violent discharge of burning and noxious battery components. In practice, such safety problems may occur not only in case of a mechanical damage of the battery, but, under certain conditions, also during normal operation. A special problem in this context is the formation of dendrites at an electrode during charge; these pine crystals may pierce the separator of the battery and cause a short circuit with an adjacent counter electrode.

Thus, battery manufacturers try to control, by electronic, mechanic or chemical means, the charge/discharge circuit in such a manner that the current flow is interrupted below a critical temperature, making the occurrence of a "thermal runway" impossible. To this end, e.g., pressure-sensible mechanic or temperature-sensible electronic switches are integrated into the internal battery circuit. Furthermore, it is being discussed to interrupt the current transport irreversibly by chemical reactions in the electrolyte or by mechanical changes of the separator, as soon as a critical temperature threshold is reached. Finally, it is general practice to prescribe the use of exactly specified electronic charging devices, thus strictly limiting the charge currents and the end-of-charge voltages.

However, in spite of these measures, the safety standard for many nonaqueous cells is insufficient. Lithium ion cells, for example, are only used with capacities of at most 1.3 Ah, because with bigger cells the safety risks are, based on the current state of the art, too high.

It is an object of the instant invention to increase the security of nonaqueous electrochemical cells in a manner which is as cost-effective and simple as possible.

This object is achieved by a non-aqueous electrochemical cell comprising a negative electrode, an electrolyte solution and a positive electrode which is characterized by the fact that it contains a salt in solid state in the range of at least one of the electrodes.

The invention results in a substantial improvement of operational safety. The speed of reaction in case of an internal short-circuit, is dramatically reduced. Also the building up of pressure in the cell housing is reduced drastically, thus minimizing the risk of the discharge of solid or gaseous matters or even fire. In many cases additional positive effects are obtained. In particular, a substantial reduction of self-discharge during cell storage was observed in experiments.

The causes of the advantageous effects of the invention are not yet fully clarified. It is assumed that the solid salt arranged in the vicinity of the electrode delays the access of the electrolyte to the electrode surface, thus slowing down safety-critical reactions between the electrolyte and the substances generated or deposited at the electrode surface. Also spreading of a local heating is reduced by the salt. Furthermore, it can be assumed that the salt melts in case of a strong local temperature rise. The necessary heat of fusion is extracted from the reaction. It is assumed that this effect occurs already at temperatures below the melting point of the pure salt, because salt mixtures having a lower melting point are generated by the electrochemical reactions occurring in the cell and by additional reactions occurring due to local short circuits. Furthermore, based on the experimental validation carried out so far, it can be assumed that, due to the presence of the solid salt in the range of the electrode, chemical reactions occur in case of a short-circuit which shift the chemical equilibrium of the mentioned exothermic reactions, causing them to occur only to a very reduced extent.

The increased security achieved by the invention is of special importance for secondary cells, because of the safety risks existing during the charge process. However, also for primary cells the invention creates positive effects.

A particularly important field of application are cells in which the negative electrode (anode) contains, in the charged state, a metal as active mass. Of particular importance are cells the active metal of which is an alkali metal, an alkaline earth metal or a metal of the second subgroup of the periodic chart of the elements (in particular, zinc or aluminum). Lithium, sodium and calcium cells bear particular safety risks, as they contain, in charged state, a highly reactive active metal at the anode. In case of lithium ion accumulators, for example, lithium is incorporated into an electrode which consists of graphite or of a carbonaceous compound. The electrolyte of these cells is based on an organic solvent. These components may react violently in case of external heat stress or due to sudden heat caused by a short circuit.

An important field of application of the invention are cells in which the negative electrode contains an active metal in charged state, in which an electrolyte based on sulfur dioxide is used, and in which ions of the active metal are incorporated into the positive electrode during the discharge of the cell. During the charge process of such cells, the active metal is deposited onto the negative electrode. The term "$SO_2$-based electrolyte" designates those electrolytes which contain $SO_2$ not only as addition in low concentration, but in which the mobility of a species containing the active metal is based on the presence of the $SO_2$, in other words cells in which the $SO_2$ acts as a solvent for the species transporting the charge in the electrolyte, i.e. the ions of the active metal. Such cells can be completely inorganic, meaning that they contain neither carbon nor any organic components.

Among such cells, those in which the active metal of the negative electrode is an alkali metal, in particular lithium or sodium, are of particular practical importance. In this case, the charge-transporting species in the electrolyte is generally formed by ions of a conducting salt, preferably a tetrachloroaluminate of the alkali metal, e.g. $LiAlCl_4$. Particularly advantageous are cells the positive electrode of which comprises a metal oxide, in particular an intercalation compound. Such a cell is described in U.S. Pat. No. 5,213,914.

In order to achieve its positive effect, the solid salt must be arranged "in the range" of the electrode in such a manner, that it has an effect on the exothermic reactions occurring in the immediate vicinity of the electrode surface during safety-critical situations. Preferably, the salt is an alkali metal halide, in particular, LiF, NaCl or LiCl. An immediate contact between the electrode and the salt is not absolutely necessary. It is, however generally preferred if there is a contact to the electrode, in particular to an active mass formed at the electrode, during at least a part of the charge/discharge cycle of the cell.

Preferably, the salt should have a porous structure. A porous structure of the salt is particularly advantageous for cells in which during charge or discharge a deposit of an active mass takes place, i.e. the volume of the active mass increases at the electrode, in the area of which the solid salt is located. In such cells, the porous structure of the salt should be formed and arranged in such a manner, that the active mass which grows at the electrode during charge or discharge of the cell, penetrates into the pores of the porous salt structure. Thereby a large surface contact is provided between the salt and substances which are formed at the electrode during the charge or discharge of the cell and which may lead to safety-critical states, or which may cause generation of heat in case of a "thermal runway". This contact at a large surface area increases the efficiency of the salt.

The invention will subsequently be explained in more detail by embodiments schematically represented in the figures.

Figure 1:
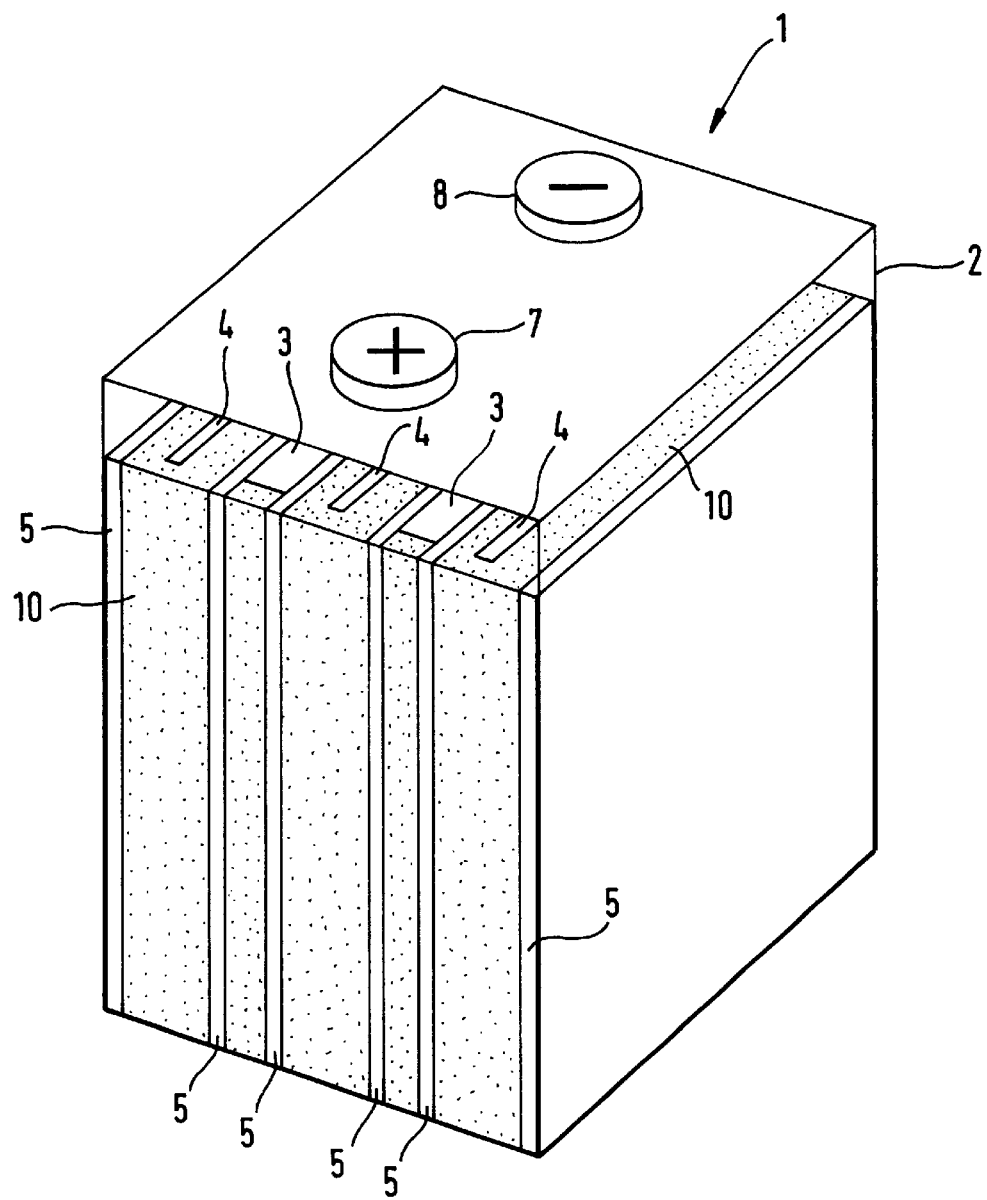
FIG. 1 shows a perspective representation of an electrochemical cell according to the invention with transparent housing.

The battery 1 represented in FIG. 1 has a housing 2, which is shown transparent in order to visualize the internal arrangement. In practice, the housing 2 is made from opaque sheet steel.

In the housing 2, a plurality of positive electrodes 3 and negative electrodes 4 can be seen, separated from each other by a separator 5. As common in battery technology, the electrodes 3,4 form layers with small thickness in relation to their surface are. The surface area of the separators is preferably a little larger than the surface area of the electrodes. The arrangement is—as represented—sandwich-type, i.e. a positive electrode 3 and a negative electrode 4 are separated by a separator 5 arranged between them. A salt 10 in solid state is located between the negative electrode 4 and the separator 5.

The inside of the housing 2 is filled with an electrolyte not shown in the figure, at least covering the upper border of the electrodes. The electrodes are connected to the external battery contacts 7,8 via wires not represented in the figure. A positive electrode 3, a negative electrode 4 and the electrolyte in-between form an electrochemical cell.

FIG. 1 shows an exemplary arrangement with three negative electrodes 4 and two positive electrodes 3. In the represented case, where the positive electrode is formed by a layer of an intercalation compound of a metal oxide, the thickness of the salt layer between the negative electrode 4 and the adjacent separator 5 corresponds approximately to the thickness of the positive electrode. In many cases, however, a lower thickness of the salt layer is sufficient. Preferably, the thickness of the salt layer is at most 70%, and with particular preference it is at most of 50% of the thickness of the positive electrode.

Apart from the salt 10 arranged in the area of the negative electrode, the design is conventional. Other previously known cell or battery designs can also be used.

Figure 2:
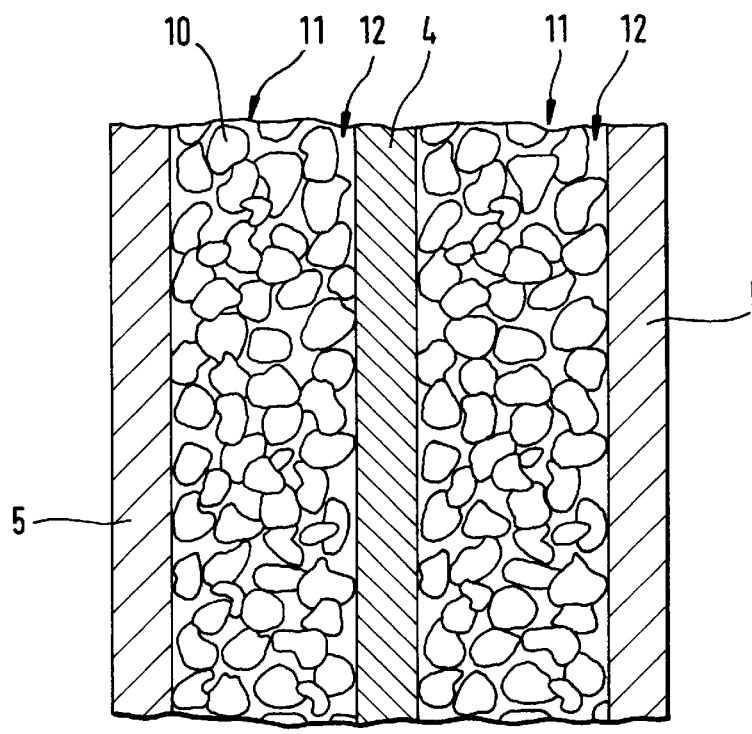
FIG. 2 shows a schematic representation of a filling of solid salt located between an electrode and a separator.

FIG. 2 shows, schematically and enlarged, the arrangement of a porous structure 11 of the salt 10 in the area of an electrode, in this case of a negative electrode 4. The porous structure 11 may be a loose filling of salt grains. During the manufacturing process of the battery, the electrode 4 and the separator 5 are assembled with a clearance in between. Thereafter the gap 12 between these elements is filled with salt. Adequate constructive measures are taken so that the salt filling cannot drain out of the gap 12. The most simple way to achieve this is to fill, with the salt 10, the entire empty space which remains after mounting the electrodes and the separators in the battery 1, as shown in FIG. 1. There is, however, also the possibility to provide limiting walls (preferably made from an inorganic, electrically insulating material, as e.g. ceramics) in order to avoid the draining of the salt 10 from the gaps 12.

Alternatively, the porous structure represented in FIG. 2 can be a solid body formed by binding of salt particles (e.g. by means of a ceramic binding agent) or by sintering of salt grains.

Figure 3:
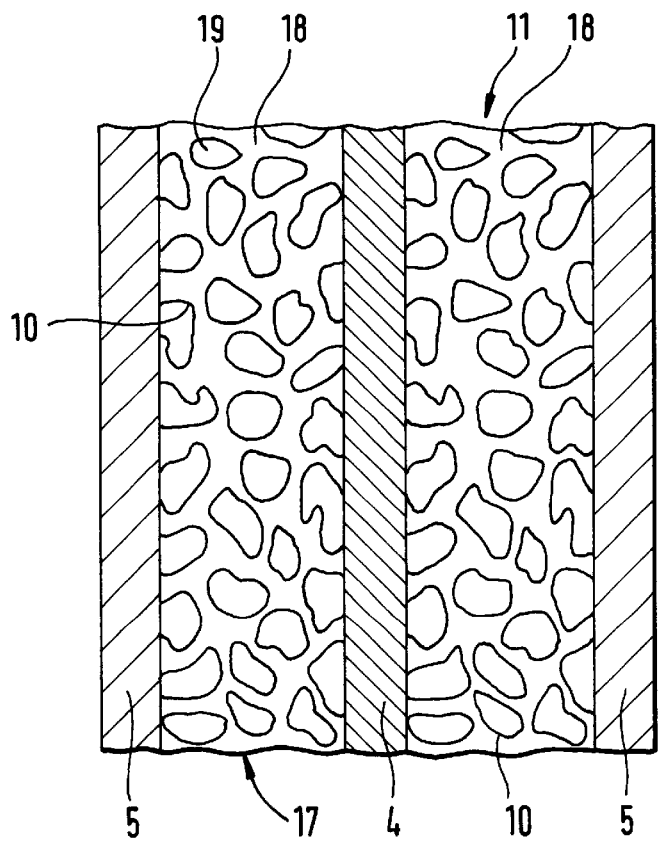
FIG. 3 shows a schematic representation according to FIG. 2 with a salt structure in form of a porous layer of solid matter.

FIG. 3 is a schematic representation of an embodiment in which the salt is contained in a porous solid matter layer 17. In the embodiment shown, the layer material is made by coating a porous carrier material 18 with the salt 10 in such a manner that its pores 19 are not completely closed. The carrier material can be, e.g., a carrier body made of a chemically inert, rigid material, e.g. glass or oxide ceramics. The salt coating can be performed by immersing the carrier material into a highly concentrated (preferably saturated) saline solution and subsequent evaporation of the water. As this procedure is quite expensive, it seems less preferable for the majority of applications. Cases of application are, however, possible in which the increased mechanical stability of the porous salt structure, due to the use of a rigid porous carrier body, is advantageous and justifies the higher manufacturing expense.

Instead of a carrier body, a flexible fiber compound structure, e.g. in form of felt, fleece or fabric, can be used as carrier material 18. In order to coat such a fiber compound structure with salt 10 in such a manner that the pores 19 do not close completely, an impregnation process is suitable, in which the fiber compound structure is wetted (e.g. by immersing or spraying) with a relatively thin liquid which contains an appropriate binder and the salt 10. Appropriate binders for this purpose are inert polymers, in particular fluor polymers. The fiber compound structure may also consist of an inert polymer. Furthermore inert inorganic fiber materials, in particular fiber glass, are appropriate.

The grain size of the porous structure 11 may vary within wide limits. The experimental examination of porous salt structures without further components lead to the result that the safety-increasing effect improves, up to a certain limit, with decreasing grain size. For very small grain sizes, however, a degradation of the safety effect was observed. This may be caused by the fact that an active mass, the volume of which increases at the surface of the electrode 4 during the charge or discharge process, cannot penetrate any longer into a porous structure of very fine grain size, rather displaces the salt from the electrode surface. In order to avoid this effect, the structure in which the salt is contained, should not have too small pores. Furthermore, care should be taken by appropriate constructive measures that the porous structure 11 is fixed to the surface of the electrode 4 in such a manner that an active mass generated at the electrode surface penetrates into the pores without displacing the salt as a whole. In this context, a porous structure in the form of a compound of salt particles or a porous structure formed by means of a porous solid matter layer, is more advantageous than a loose filling. The optimal grain size for individual cases must be determined in experiments. Generally, grain sizes between 100 μm and 500 μm have proven appropriate for salt fillings.

Figure 4:
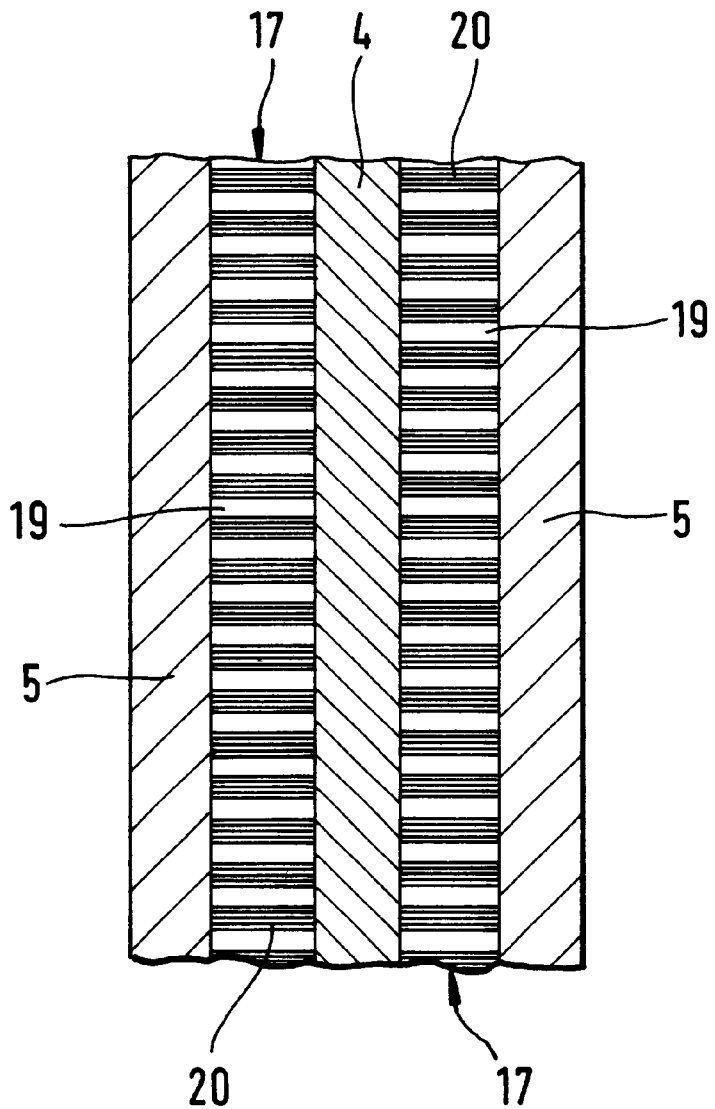
FIG. 4 shows a schematic representation according to FIG. 3 with an alternative design of a salt structure in form of a porous layer of solid matter.

FIG. 4 shows—once again as a strongly schematized representation—a design in which the layer material 17 is a mixture 20, containing the salt and a binder. In practical experiments with this embodiment, polytetrafluoroethylene was mixed intensively with the salt, the mixture was rolled out to a sheet with a thickness of approximately 0.5 mm and subsequently, the sheet was perforated mechanically by means of a porcupine roll. By this method, pores 19 are generated, which penetrate the solid matter layer on a straight path of, as represented in FIG. 4. For manufacturing bigger quantities, other known procedures for the production of porous plastic layers with the salt integrated in the composition may be used on the basis of a polymer with sufficient binding characteristics. Again fluor polymers are appropriate.

Such an embodiment has the advantage that the porous structure of the salt 10 is not determined by the mere salt, but by the porosity of the compound of the salt and the binder. Thereby, the pore size of the solid matter layer material 17 becomes independent from the grain size of the salt. Thus, with this embodiment, a very fine ground salt with a medium grain size of less than 50 μm can be used advantageously in a structure the pores of which are big enough to enable the desired penetration of the active mass formed at the electrode surface, into the pores of the layer material.

The explained embodiments show that rigid as well as elastic materials, meeting the required conditions for the respective application, may serve as materials of the solid matter layer. One of these conditions is that they form a thin layer, as compared to their surface area, which can be arranged parallel to the electrode, in the range of which the salt is to be located. Furthermore, the material must contain a sufficient quantity of salt per unit volume. This can essentially be obtained in two ways. On the one hand a porous carrier material can be coated with salt in such a manner that the pores are not completely closed, and, on the other hand, the porous layer material itself may comprise of a mixture which contains the salt.

The necessary amount of the solid salt in the area of an electrode should be experimentally determined for the individual case. The molar concentration of the salt, in relation to the molar concentration of the maximum active mass deposited on the electrode, can be used as a guideline. Generally, the molar concentration of the salt should correspond to at least the 0.1-fold, preferably at the least the 0.3-fold molar concentration of the maximum active mass.

EXAMPLES

The invention was tested by means of an experimental setup with following characteristics:

Positive electrode: Intercalation electrode of 3 g $LiCoO_2$.

Negative electrode: Nickel sheet with a thickness of 0.05 mm, on the surface of which lithium was deposited during the charge of the cell.

Electrolyte on the basis of $SO_2$ with $LiAlCl_4$ as conducting salt with a $SO_2/LiAlCl_4$ ratio of 1.5 in a quantity of approximately 8 ml.

The cell was charged to its maximum capacity of approximately 580 mAh, and subsequently submitted to a nail test, during which a nail was pierced through the negative electrode and the separator into the positive electrode. The reaction was observed by means of a high speed video recording.

Experimental observations of the area of the negative electrode in which an artificial short circuit was generated by the nail test and with different solid salts (approximately 1 g, respectively) but otherwise equal conditions, are represented in the following table 1.

TABLE 1

| Reaction speed | without salt 100 ms | NaCl 1.5 s | CaCl 0.8 s | LiCl 1–2 s | LiF 1–3 s |
|---|---|---|---|---|---|
| Observations | Violent reaction; strong smoke formation, big flame front, electrode sheet destroyed | hardly any smoke formation; small flame front; electrode sheet well conserved | small smoke formation, small flame front, electrode sheet only partially destroyed | Flame front in an area where no salt was present | small smoke formation, small self-extinguishing flame front |

A dramatic improvement of the safety behavior of the cell due to the solid salt arranged in the range of the electrode can be observed, both with respect to the reaction speed and with respect to the spatial reaction progress. Instead of the pure salt, salt mixtures as e.g. a mixture of LiF and LiCl, can also be used.

The self discharge behavior was also investigated in the scope of the same experiments. To this end the cell was stored at a temperature of 50° C., a temperature substantially above the usual application conditions, for 24 hours. After 24 hours, the cell without salt in the electrode area had been discharged to practically 100%. In contrast, the cells with LiCl and LiF had been discharged only by 30% and 20%, respectively. Thus, the self-discharge of the cells is influenced very positively by the presence of the salt in the electrode area.

According to the current state of knowledge of the inventors, the positive effect of the salt can be partially explained by the physicochemical effects explained before (slowing down of the access of electrolyte to the electrode surface; slowing down of the expansion in space of a local heating; heat consumption as fusion heat). Additionally the following considerations should be taken into account.

It can be assumed that safety-critical reactions, in particular the "thermal runaway", relate to the formation of a covering layer, in particular on the negative electrode of alkali metal cells. For example, in case of the cell Li|$LiAlCl_4$|$LiCoO_2$, the lithium reacts with the sulfur dioxide forming a covering layer of $Li_2S_2O_4$. At the same time, there is a solution reaction in the electrolytic solution, in which the $Li_2S_2O_4$ decomposes to $Li^+$ and $S_2O_4^{2-}$. Under normal operating conditions, this does not cause any problems, since the strongly exothermic covering layer formation reaction is very slow.

However, if the temperature rises for any reasons, the solubility of the covering layer increases. This causes an easier access of the electrolyte to the lithium deposited on the electrode surface; the exothermic-covering layer formation reaction is strongly accelerated. The resulting heat production causes a self-amplifying effect which may start a "thermal runway". It can be assumed that the covering layer formation reaction is substantially slowed down by the presence of the solid salt, thus leading to the described decisive improvement of the operational safety. Similar mechanisms are true for other cell types. In lithium ion accumulators, in particular, there is on the negative electrode (usually consisting of graphite or a carbon compound) a covering layer formation, which is an important cause of the safety problems.

In many cases, additional problems are caused by exothermic side reactions, which occur more often with increasing temperature. For example, $LiALCl_4$, the conductive salt of the electrolyte in the cell described above, decomposes to LiCl and $AlCl_3$. While this reaction itself is not very exothermic, it leads to highly exothermic follow-up reactions of the $AlCl_3$. It is assumed that the solid salt reacts with the $AlCl_3$. For the salts LiF and LiCl, e.g., the following reaction mechanisms ban be assumed:

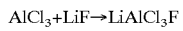

These reactions are not only advantageous because the AlCl3 reacts off, thus being withdrawn from the mentioned exothermic follow-up reactions, but also, because the reaction products of the described reactions are solid matter, the formation of which does not effect—as in case of gases—a fast pressure rise and thus, does not result in the danger of explosion.

What is claimed is:

1. Rechargeable non-aqueous electrochemical cell (9) comprising a negative electrode (4), an electrolyte based on sulfur dioxide and a positive electrode (3), wherein an active mass is deposited at any one of the electrodes (3,4) during charging or discharging of the cell, characterized in that it contains a salt (10) in solid state in a porous structure (11) in the range of at least one of the electrodes (3,4) and the salt (10) is provided and arranged in such a manner that it is in contact with the active mass which is deposited at said electrode.

2. Cell according to claim 1, characterized in that the porous structure is a granular filling (11) of the salt (10).

3. Cell according to claim 2, characterized in that the porous structure (11) is a solid body of salt particles.

4. Cell according to claim 1, characterized in that the salt (10) is contained in a porous solid matter layer (17).

5. Cell according to claim 4, characterized in that the porous solid matter layer (17) comprises a carrier material (18) coated with salt (10) in such a manner that its pores (19) are not completely closed.

6. Cell according to claim 5, characterized in that the carrier material is a flexible fiber compound structure.

7. Cell according to claim 4, characterized in that the porous solid matter layer is made from a mixture containing the salt and a binder.

8. Cell according to claim 7, characterized in that the binder contains a polymer, in particular a fluor polymer.

9. Cell according to claim 1, characterized in that the porous structure of the salt (10) is provided and arranged in such a manner that the active mass of the electrodes, deposited during the charge or discharge, penetrates into the pores of the porous structure.

10. Cell according to claim 1, characterized in that the salt (10) is an alkali metal halide, in particular LiF, NaCl or LiCl.

11. Cell according to claim 1, characterized in that the active mass is selected from the group consisting of the alkali metals, the alkali earth metals and the metals of the second subgroup of the periodic chart of the elements.

12. Cell according to claim 1, characterized in that the active mass is lithium, sodium, calcium, zinc or aluminum.

13. Cell according to claim 12, characterized in that the positive electrode (3) contains a metal oxide.

14. Cell according to claim 13, characterized in that the positive electrode (3) contains an intercalation compound.

15. Cell according to claim 1, characterized in that the salt (10) is arranged in the range of the negative electrode (4).

* * * * *